A. DICKINSON.
Gas Purifier.
No. 24,543.
Patented June 28, 1859.
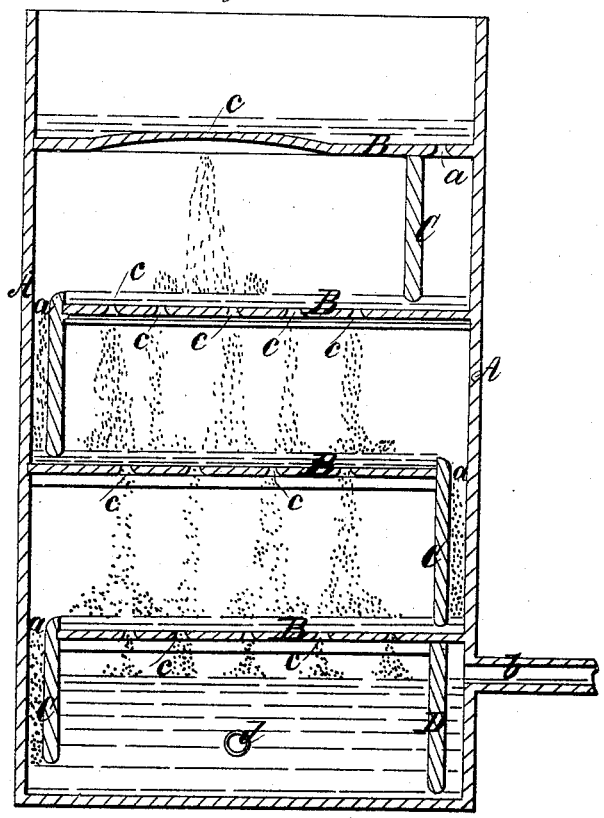
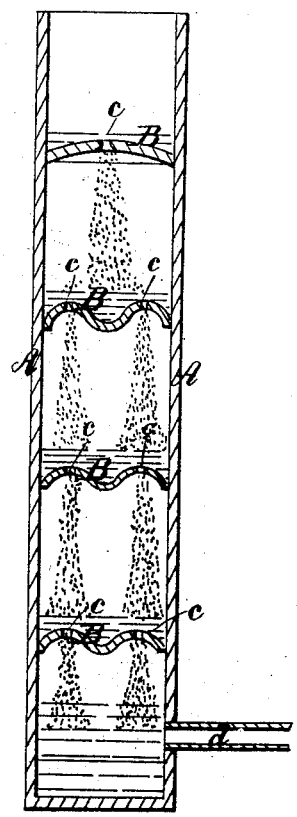
Witnesses:
S. F. Redfield
H. W. Galpin
Inventor:
Aurelius Dickinson

UNITED STATES PATENT OFFICE.

AURELIUS DICKINSON, OF CLAREMONT, NEW HAMPSHIRE.

APPARATUS FOR PURIFYING GAS.

Specification of Letters Patent No. 24,543, dated June 28, 1859.

*To all whom it may concern:*

Be it known that I, AURELIUS DICKINSON, of Claremont, in the county of Sullivan and State of New Hampshire, have invented a new and useful Improvement in Washers or Water-Purifiers for Illuminating-Gas; and I do hereby declare that the following is a full, clear, and exact description of the same, reference being had to the accompanying drawings, forming part of this specification, in which—

Figures 1 and 2 are vertical sections of a gas washer with my improvement.

Similar letters of reference indicate corresponding parts in both figures.

The object of my invention is to bring the gas into a more intimate and diffused contact with the water used for washing and purifying it than is done in the washers or water purifiers heretofore employed, and to this end my invention consists in the construction of a washer or purifier in the manner described as follows with reference to the drawings.

A, is an upright box having a number of horizontal partition plates B, B, extending all across the box and from one end nearly to the other, and each having an opening $a$, at or near the end, the said openings being alternately at one and the other end of the box, throughout the series, so that the water admitted at the top of the box may descend through the said openings from one to the other end and have a circulation along the said plates back and forth in opposite directions from one end of the box to the other. C, C, are upright plates attached to each horizontal plate B, close to or near the openings $a$, $a$, and extending all across the box; said plates, or all but that one attached to the upper plate B, extending some distance above the tops of the corrugations of the said plates B, B, and all extending downward nearly to the surface of the plate B, below, and the bottom one extending nearly to the bottom of the box. To the lowest plate B, there is also attached near the end of the box farthest from the lowest extremity $a$, another upright plate D, which also reaches nearly to the bottom of the box; and in the last-mentioned end of the box below the lowest plate B, is arranged the water outlet $b$. Each of the plates C, C, which extend above their attached plates B, B, reaches above the level of the bottom edge of the next plate B, above. The plates B, B, may be corrugated longitudinally, all but the upper one represented in the drawing, or made with their upper sides concave like the top one, and each is provided with a number of orifices $c$, $c$, said orifices being in the highest portions of the plates, as shown in Fig. 2. The gas inlet $d$, is in one side of the box, near the bottom and between the plates B, and D. The box is to have a cover and the upper compartment to have an inlet pipe for water and an outlet pipe for the gas.

The operation of the washer or purifier is as follows. The water entering at the top overflows the plates C, from one plate B, to another, and falls in showers through the orifices $c$, $c$, till it reaches the bottom of the box and flows out through the outlet $b$, while the gas entering at the bottom and being prevented passing up the opening $a$, by the lower edges of the plates B, B, being submerged in water, escapes upward through the orifices $c$, $c$, till it escapes at the top of the box. The gas having to pass right through the water on the plates B, B, and being also brought in contact with the falling showers of water from the said orifices, is thoroughly washed and purified. The arrangement of the orifices $c$, $c$, in the highest parts of the corrugations or concave portions of the under side of the plate is of immense importance to the successful performance of the washing operation, as the gas, in attempting to escape, is collected in the concavities among the falling water, and thus brought into more intimate contact than if the orifices were otherwise arranged, or then if the plates B, B, were flat.

I do not claim broadly the invention of a gas washer having horizontal perforated partitions along which the water flows and from which it falls in showers, while the gas passes over the surface of and through the water.

But what I claim as new and desire to secure by Letters Patent, is—

The washer constructed as described with horizontal plates B, B, corrugated or with their bottoms partly or wholly concave and with upright plates projecting above and below the said plates and dipping into the water below the said plates, and with orifices so arranged in the highest portions of the said horizontal plates as to cause the collection of the gas in the concave portions of the said plates below and around said orifices, substantially as herein described.

AURELIUS DICKINSON.

Witnesses:
S. F. REDFIELD,
H. W. GALPIN.